United States Patent
Fulton et al.

(10) Patent No.: US 10,926,956 B2
(45) Date of Patent: Feb. 23, 2021

(54) FOLDABLE CONVEYOR SYSTEM

(71) Applicant: Ramper Innovations, Inc., Boise, ID (US)

(72) Inventors: Tim J. Fulton, Boise, ID (US); Tasche L. Streib, Boise, ID (US); John A. Laz, Boise, ID (US); David Moulin, Boise, ID (US); Nickolas P. Hirte, Oshkosh, WI (US); Kevin S. Heisler, Oshkosh, WI (US); Matthew R. Poulsen, Appleton, WI (US); Ricky D. Cross, Neenah, WI (US); David J. Barrent, Manitowoc, WI (US)

(73) Assignee: Ramper Innovations, Inc., Boise, ID (US)

( * ) Notice: Subject to any disclaimer, the term of this patent is extended or adjusted under 35 U.S.C. 154(b) by 0 days.

(21) Appl. No.: 16/678,887

(22) Filed: Nov. 8, 2019

(65) Prior Publication Data
US 2020/0130940 A1    Apr. 30, 2020

Related U.S. Application Data

(63) Continuation of application No. 15/914,453, filed on Mar. 7, 2018, now Pat. No. 10,486,905.
(Continued)

(51) Int. Cl.
| | |
|---|---|
| *B65G 15/24* | (2006.01) |
| *B65G 21/14* | (2006.01) |
| *B65G 43/02* | (2006.01) |
| *B65G 23/04* | (2006.01) |
| *B65G 23/44* | (2006.01) |

(52) U.S. Cl.
CPC ............ *B65G 15/24* (2013.01); *B65G 21/14* (2013.01); *B65G 23/04* (2013.01); *B65G 23/44* (2013.01); *B65G 43/02* (2013.01); *B65G 2201/0264* (2013.01); *B65G 2203/047* (2013.01); *B65G 2207/40* (2013.01); *B65G 2814/0398* (2013.01)

(58) Field of Classification Search
None
See application file for complete search history.

(56) References Cited

U.S. PATENT DOCUMENTS

| | | | | |
|---|---|---|---|---|
| 2,834,487 A | * | 5/1958 | Gaddis | B60P 1/36 414/523 |
| 2,883,033 A | * | 4/1959 | Flynn, Jr. | A21B 3/07 198/360 |

(Continued)

FOREIGN PATENT DOCUMENTS

JP        2000159323        6/2013

*Primary Examiner* — Kavel Singh
(74) *Attorney, Agent, or Firm* — Hawley Troxell Ennis & Hawley LLP; Philip McKay

(57) ABSTRACT

A foldable conveyor system is disclosed appropriate for loading and unloading an airplane using two people. In one embodiment, the foldable conveyor system is formed of a plurality of foldable sections, where each section has a first half and a second half foldably connected to each other. Each first half and each second half has reversible tension-controlled conveyor belts for moving luggage into or out of an aircraft. When fully deployed, and thus operating flat along the interior of an aircraft, the foldable conveyor system operates to move luggage and other objects placed on the foldable conveyor system in a selected direction.

8 Claims, 15 Drawing Sheets

Related U.S. Application Data

(60) Provisional application No. 62/469,065, filed on Mar. 9, 2017, provisional application No. 62/866,162, filed on Jun. 25, 2019.

(56) References Cited

U.S. PATENT DOCUMENTS

| | | |
|---|---|---|
| 4,230,044 A | 10/1980 | Rohrig |
| 5,636,728 A | 6/1997 | Best et al. |
| 6,071,063 A * | 6/2000 | McGrath ............... B62D 9/00 198/781.06 |
| 6,622,846 B1 * | 9/2003 | Dean ..................... B60P 1/02 198/370.09 |
| 7,337,895 B2 | 3/2008 | De Maeyer |
| 2006/0283686 A1 | 12/2006 | De Maeyer |
| 2015/0144536 A1 | 5/2015 | Dugat |
| 2018/0370731 A1 | 12/2018 | Miller |

* cited by examiner

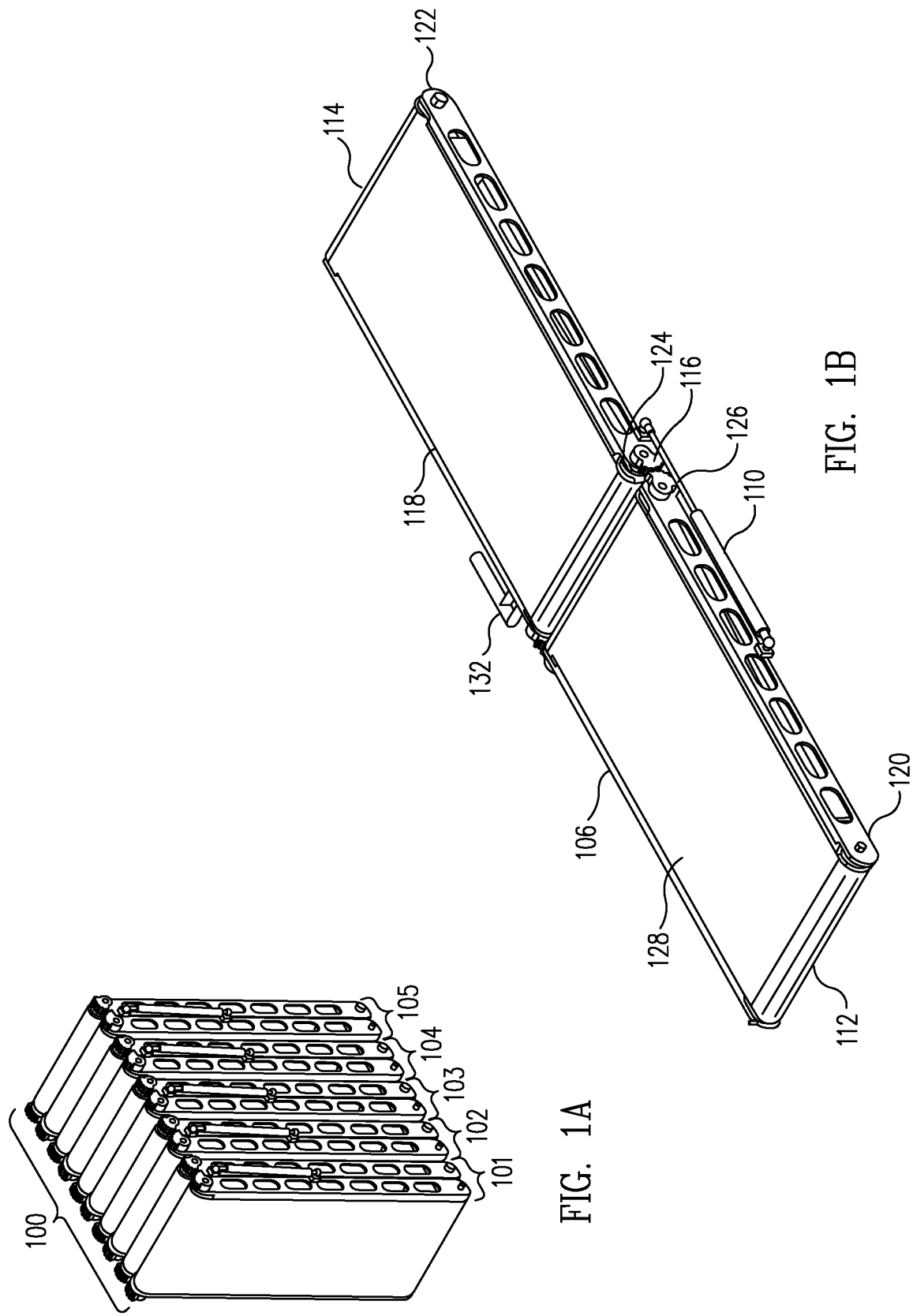

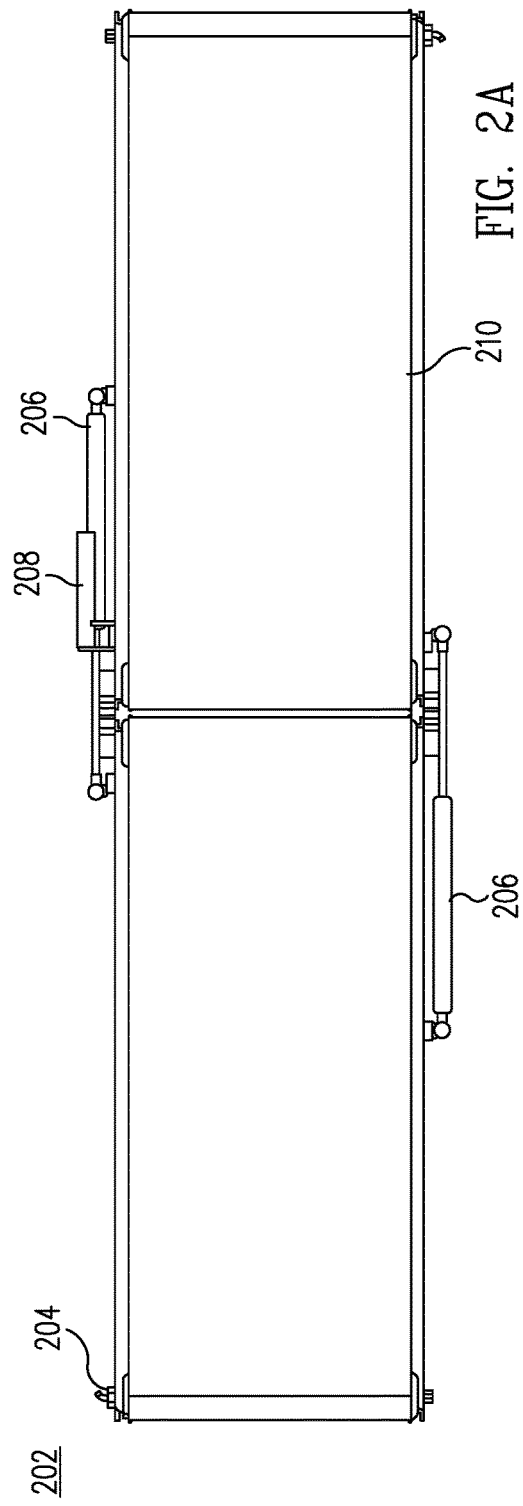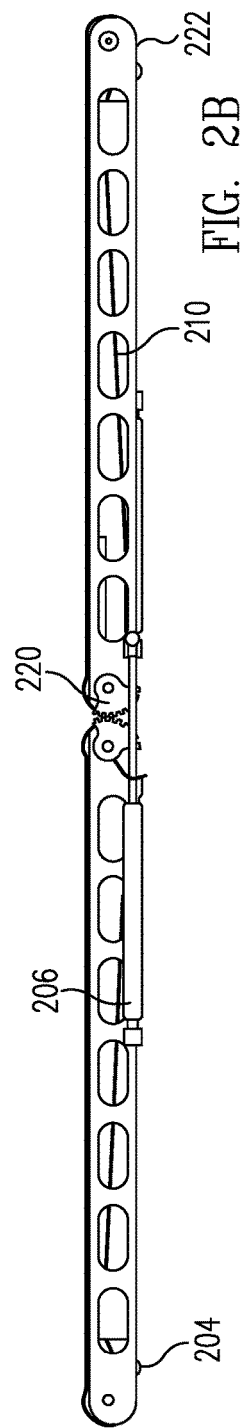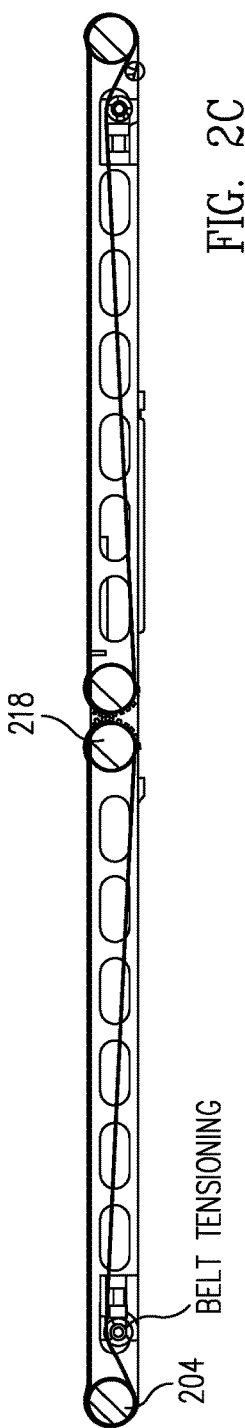

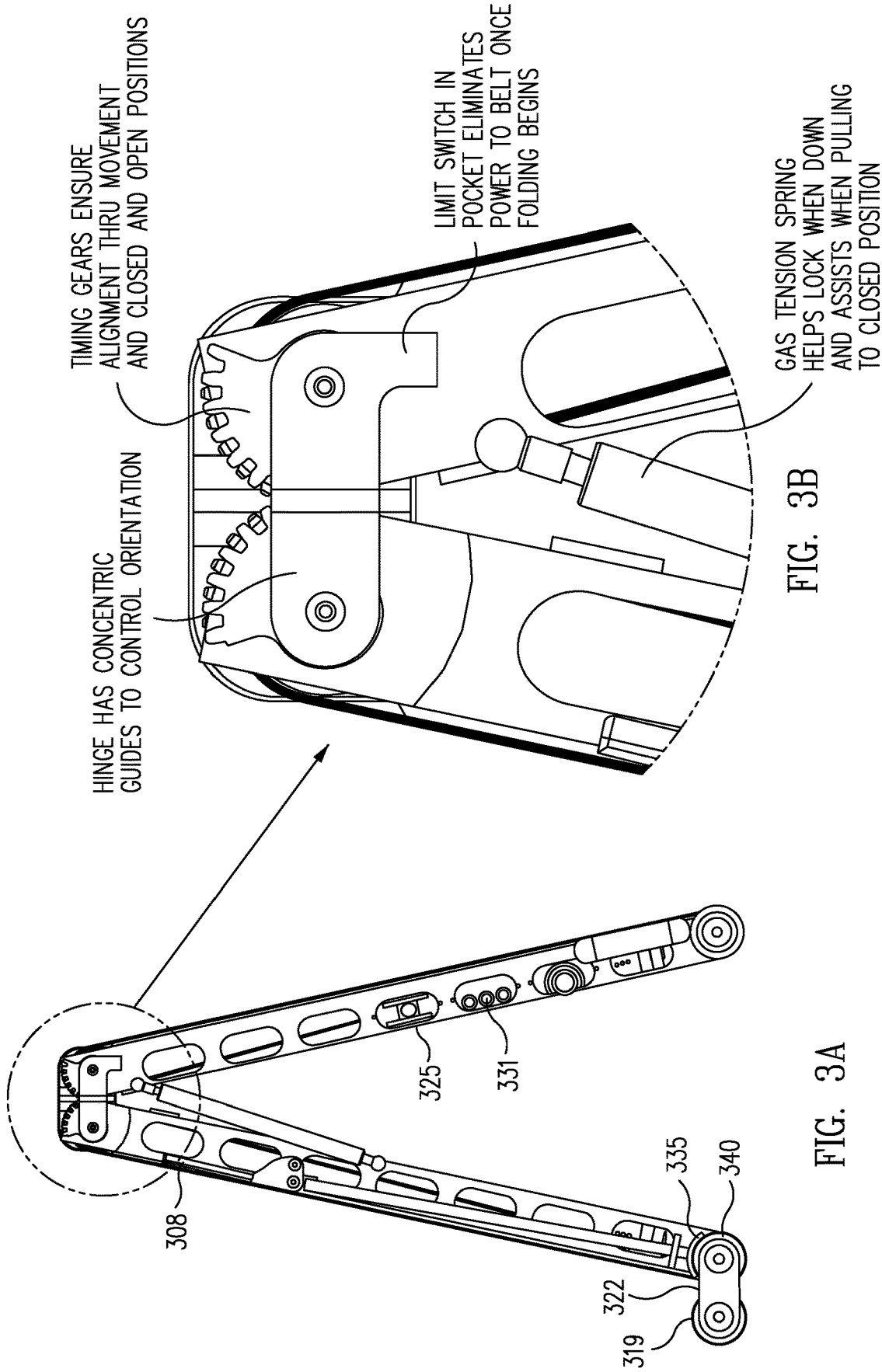

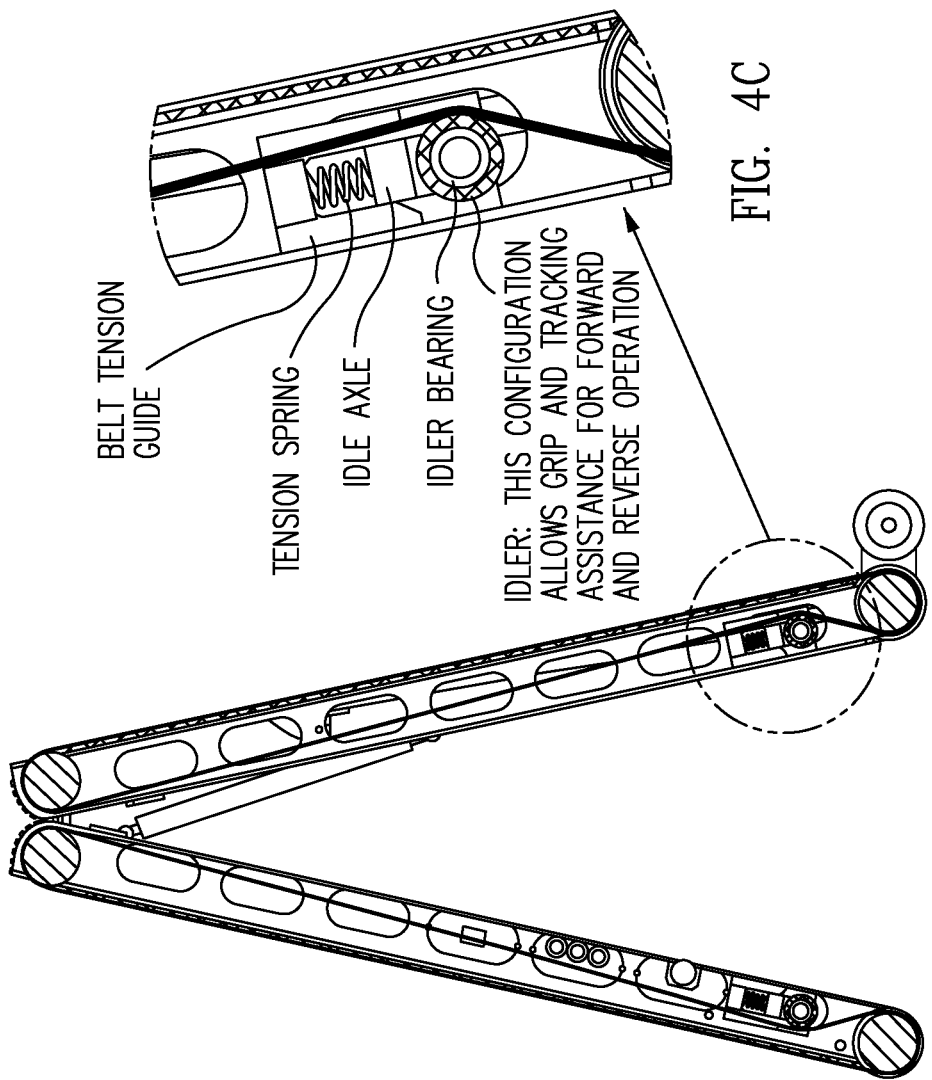
FIG. 4C
FIG. 4B
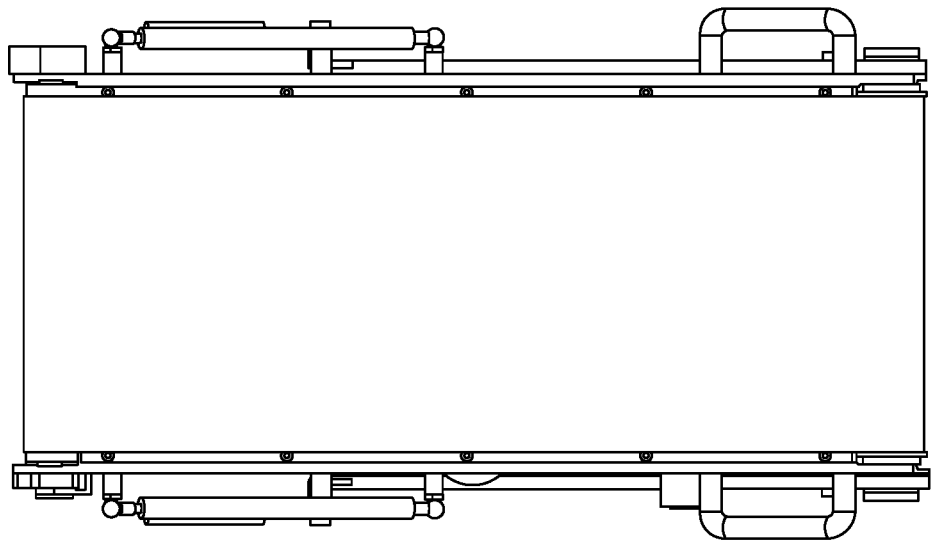
FIG. 4A

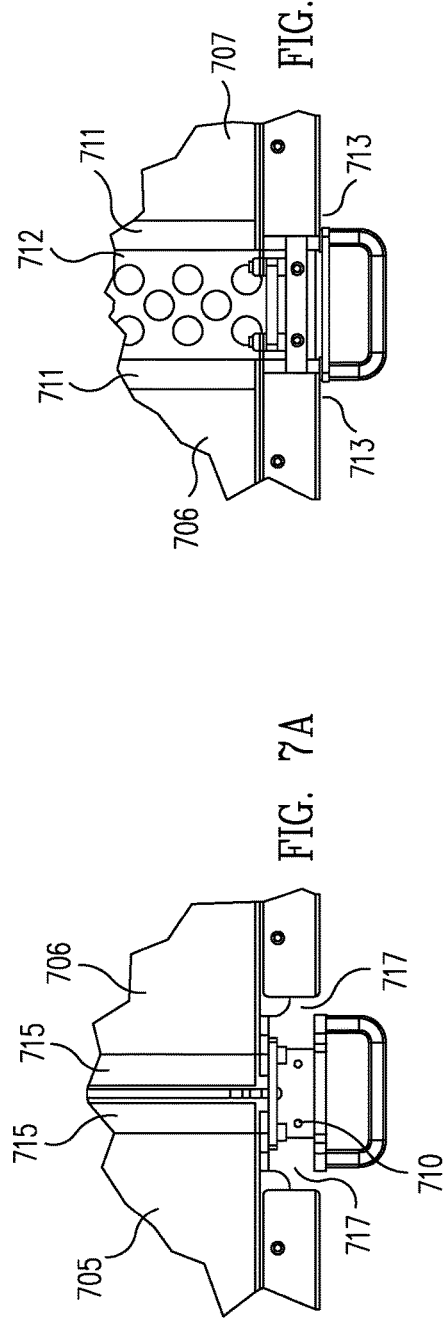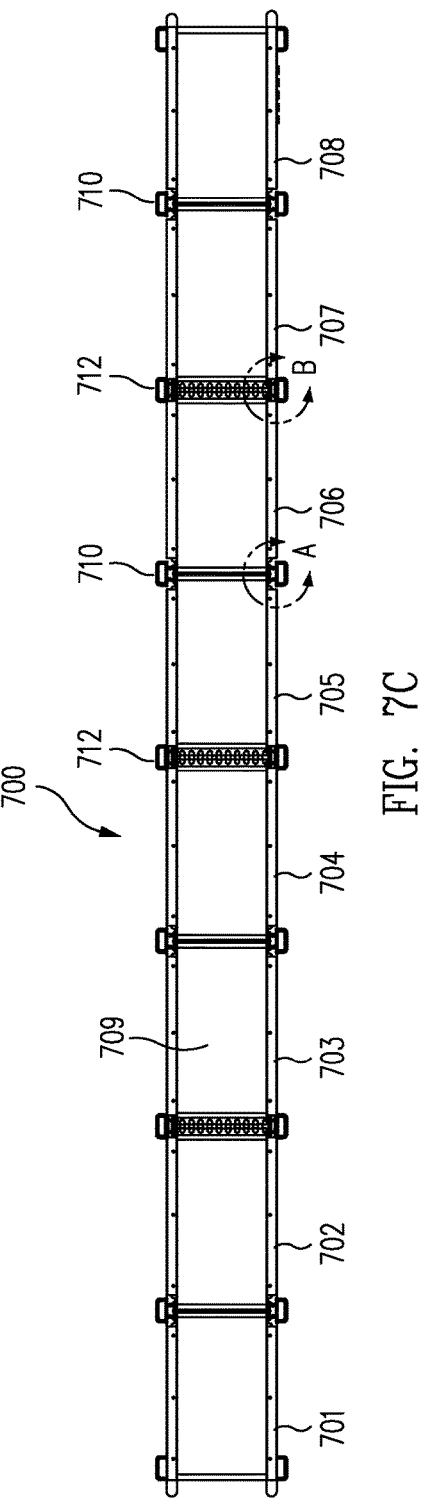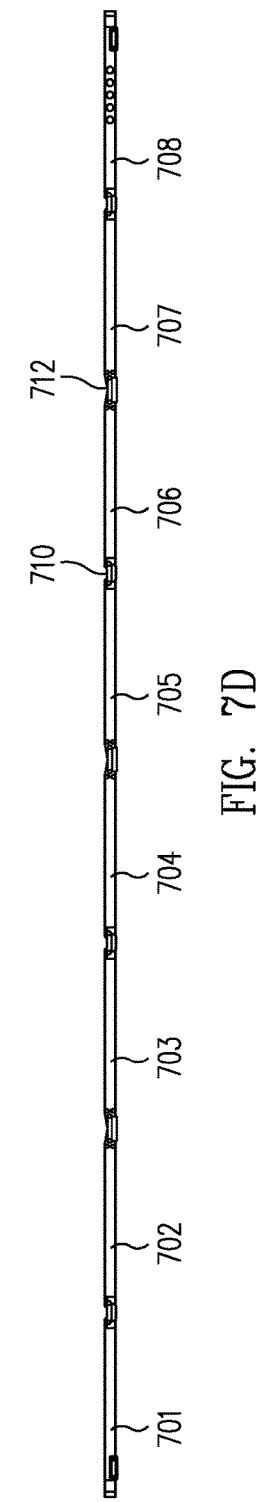

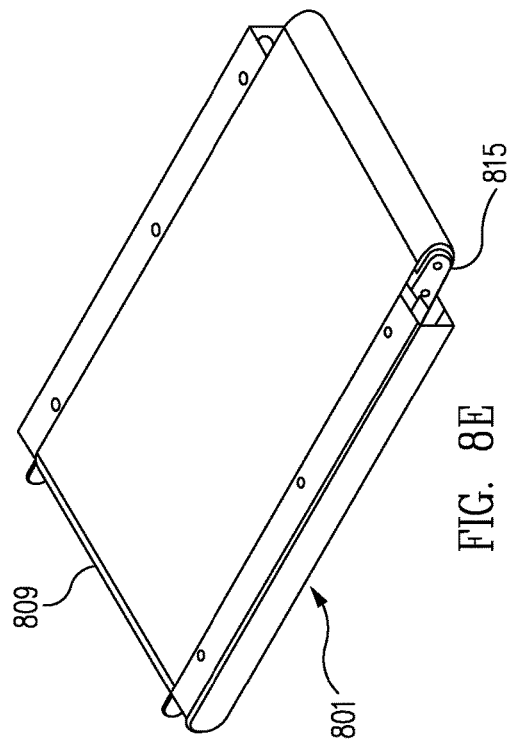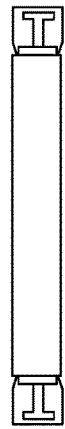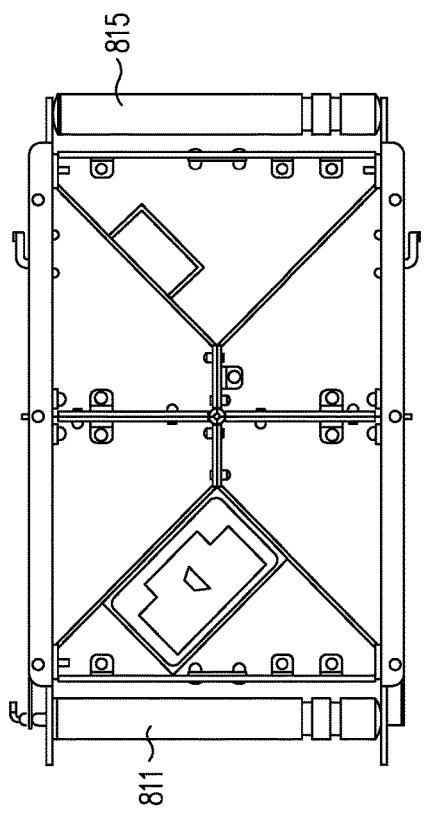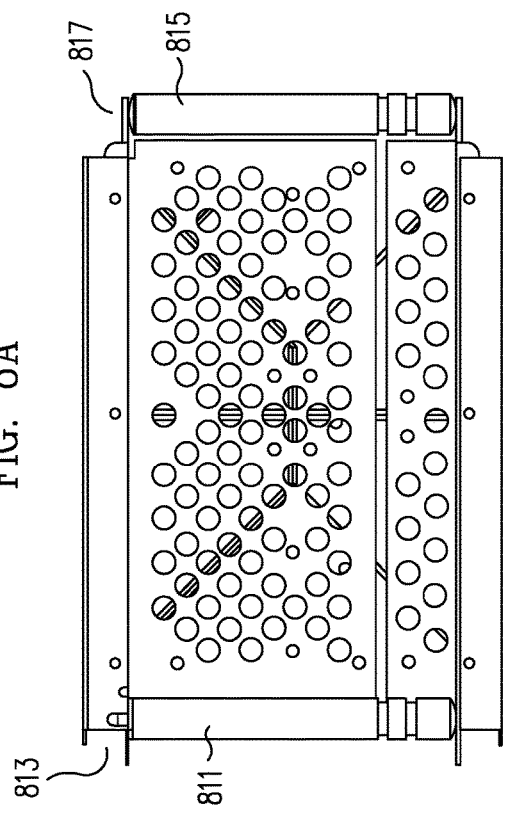
FIG. 8E
FIG. 8D
FIG. 8A
FIG. 8B
FIG. 8C

FOLDABLE CONVEYOR SYSTEM

RELATED APPLICATIONS

This application is a continuation-in-part of Fulton et al., U.S. patent application Ser. No. 15/914,453, filed on Mar. 7, 2018, entitled "SYSTEM FOR LOADING AND UNLOADING AN AIRPLANE," which claims the benefit of Fulton et al., U.S. Provisional Patent Application No. 62/469,065, filed on Mar. 9, 2017, entitled "SYSTEM FOR LOADING AND UNLOADING AN AIRPLANE." This application also claims the benefit of Fulton et al., U.S. Provisional Patent Application No. 62/866,162, filed on Jun. 25, 2019, entitled "CONVEYOR SYSTEM." Each U.S. patent application and U.S. provisional patent application referenced above is hereby incorporated by reference in its entirety as if it were fully set forth herein.

BACKGROUND

Airlines carry more than a million passengers each day. Most passengers have luggage they need to bring with them from their place of origin to their destination. Since the luggage travels on the same aircraft as the passenger, the luggage first must be checked in with a gate agent of the airline. The gate agent then sends the luggage into a secure area where the luggage is screened and sent through a series of conveyor belts and other mechanisms and eventually arrives at the aircraft belly door. At this point, the luggage is loaded onto the aircraft. After the aircraft arrives at its destination, the luggage is unloaded from the aircraft into another secure area, then delivered to a common area so the passenger may locate and retrieve the luggage. Typically, loading and unloading an aircraft is accomplished by Ramp Agents staging themselves inside the cramped belly of an aircraft, often at opposite ends, possibly including one or more people positioned at an intermediate point within the aircraft. The Ramp Agents load and unload the baggage by carrying or throwing the items.

While this process is occurring for a given aircraft at a given airport, the same process is going on for many other aircraft at the same airport. Furthermore, the same process will go on daily for thousands of other aircraft at other airports and in the air. Airlines and airports spend millions of dollars each year utilizing efficient means to move luggage. These efforts toward efficiency all stop when the bag reaches the belly door.

Although current processes have been effective from a logistical standpoint, they are slow and often cause a great deal of injury to baggage handlers and others involved with the process. Airlines spend huge amounts of money on injury-related costs due to Ramp Agents sustaining injuries on the job. Additionally, those Ramp Agents often end up with lifelong pain and suffering, due to the nature of the work involved. Moreover, airlines spend massive amounts of money for damage to luggage, damage to aircraft and lost efficiencies.

For these reasons, it would be beneficial to have a different process and/or system for loading and unloading luggage from the bellies of airplanes.

SUMMARY

Embodiments discussed herein disclose a foldable conveyor system appropriate for loading and unloading aircraft bellies using one or more people. In one embodiment, the foldable conveyor system is formed of a plurality of foldable sections, where each section has a first half and a second half, with the first and second halves being foldably connected to each other with mechanisms in place to assist with the folding and unfolding. Each first half and each second half has individual, coordinated, reversible tension-controlled conveyor belts for moving luggage into or out of an aircraft where the direction of each conveyor belt is controlled by direction-controlling switches located on one or more of the foldable sections at either end of the foldable conveyor system. When fully deployed, and thus when operating flat or relatively flat along the interior of an aircraft belly, the foldable conveyor system operates to move luggage and other objects placed on the foldable conveyor system in a direction associated with a most recent selection of the direction-controlling switches. However, for sections that are in a partially deployed state or when a given section is folded, one or more limit switches prevent the conveyor belts for that partially deployed or folded section from getting power. Thus, in those conditions, conveyor belts associated with that partially deployed or folded section are unable to move, ensuring operator safety. The gearing required for stability during folding/unfolding has moving guard covers to eliminate pinch points.

BRIEF DESCRIPTION OF THE DRAWINGS

FIGS. 1A and 1B are system diagrams showing a folded conveyor system and a deployed section, in accordance with one embodiment.

FIG. 2A is a section diagram top view, in accordance with one embodiment.

FIG. 2B is a section diagram side view, in accordance with one embodiment.

FIG. 2C is a section diagram cutaway view, in accordance with one embodiment.

FIG. 3A is a partially deployed section, in accordance with one embodiment.

FIG. 3B is a detail view of a portion of FIG. 3A, in accordance with one embodiment.

FIG. 4A is a view of a partially folded section, in accordance with one embodiment.

FIG. 4B is a side cutaway view, in accordance with one embodiment.

FIG. 4C is a detail view of a subset of FIG. 4B.

FIG. 7A shows a detail view of the region A depicted in FIG. 7C.

FIG. 7B shows a detail view of the region B depicted in FIG. 7C.

FIG. 7C is a top view of a conveyor system in a deployed state, in accordance with one embodiment.

FIG. 7D is a side view of the conveyor system shown in FIG. 7C.

FIG. 8A is a top sectional view of a half section of a conveyor system, in accordance with one embodiment.

FIG. 8B is a top view of the half section shown in FIG. 8E, with the conveyor belt removed.

FIG. 8C is a side view of the half section shown in FIG. 8E.

FIG. 8D is an end view of the half section shown in FIG. 8C.

FIG. 8E is a perspective view of the half section shown in FIGS. 8A-8D.

Figure 5A:
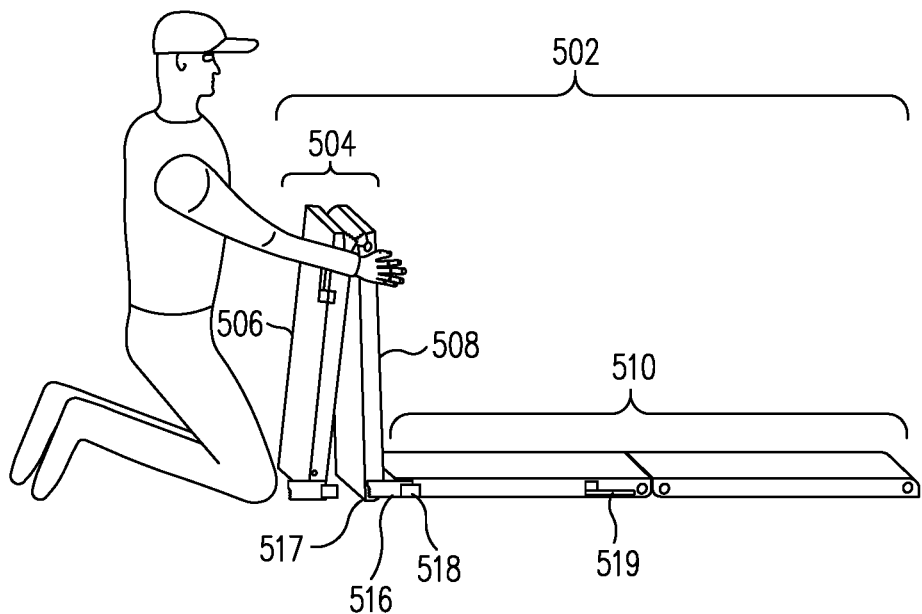
FIGS. 5A through 5D are snapshots of an animation reflecting the process of deploying the foldable conveyor system, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Although embodiments of some features may be reflected in drawings presented herein as externally mounted or as extrusions, persons of ordinary skill will readily recognize that embodiments are contemplated that include, for example, mounting tension gas springs, the timing gears, handles, and other items internally to the frame so that the tension gas spring and other items present less of a possibility for snagging on portions of the external environment.

FIGS. 1A and 1B are system diagrams showing a folded conveyor system and a deployed section, in accordance with one embodiment.

FIG. 1A includes conveyor system 100 which includes sections 101, 102, 103, 104, and 105. FIG. 1B is a representative section 106, which could be any of sections 101, 102, 103, 104, and 105 of FIG. 1A, is shown in a deployed configuration. Note that each section is relatively rectangular, and conveyor belts traverse each half of each section from side to side, with rollers at each end of each half-section. Alternatively, only one half-section of each section has a conveyor belt. In one embodiment, a half section not having a conveyor belt has low friction rollers configured to assist in the moving of the luggage from one side of that half section to the other side of that half-section.

In one embodiment, a lower portion of each half section, e.g. a portion of the half section closest to and optionally touching the floor of the aircraft when each section is fully deployed for use, is enclosed in high density plastic to minimize any friction occurring when the section is being folded, unfolded, or moved.

Tension gas spring 110 (FIG. 1B) is affixed to both the left half 112 and right half 114 of section 106 and is configured to present the most tension when tension gas spring 110 is extended, such as in the deployed configuration of the associated section, and is configured to present the least tension when a section is in a folded configuration. Thus, when tension gas spring 110 is extended, in a deployed condition of a section, tension gas spring 110 assists in folding the section, when the appropriate handle is operated by an operator of the section.

Timing gear 116 ensures that proper orientation is maintained between left half 112 and right half 114 when the individual folding section is in any configuration other than fully deployed. For example, timing gear 116 ensures that proper orientation is maintained between left half 112 and right half 114 when the individual folding section is partially deployed, so that the individual folding section can stand up, such as in an inverted V configuration similar to that seen in FIG. 3.

Conveyor belt 118 (FIG. 1B) rotates over rollers 122 and 124, and conveyor belt 128 rotates over rollers 120 and 126. In one embodiment, each section, such as section 106, 106 has a powered roller for left half 112 and a powered roller for right half 114, each powered roller powering the movement of respective conveyor belts 118 and 128 according to direction-controlling switches discussed herein. Power is supplied by a battery or other power source located within one or more of the sections and supplied through one or more wire harnesses and switches, such as direction-controlling switches and power switches discussed herein.

In one embodiment, a section optionally has a conveyor belt and at least one powered roller on one half section or the other, but not on both half-sections of a given section. In one embodiment, on a half section that doesn't have a conveyor belt and powered roller, minimal friction rollers are provided in a configuration that facilitates items rolling over the minimal friction rollers from one end, e.g. a first end, of the half-section to a different end, e.g. a second end, of the same half-section.

Lift handle 132 is used when deploying or folding a given associated section, such as section 106. Other lift handles are used in other locations of a given section, depending on a particular implementation of the invention. Handles may be mounted on a slidable mount to allow for out of the way storage when not needed, or can be pulled out and locked into place when needed to fold, unfold, and move a given section.

FIG. 2A is a section diagram top view, in accordance with one embodiment.

Referring to FIG. 2A, in various embodiments, section 202 includes, in one embodiment, powered roller 204, the power to which is controlled by one or more switches (not shown) which control power and direction of movement of conveyor belt 210. Section 202 further includes, in various embodiments, one or more of tension gas spring 206 and lift handle 208. Lift handle 208 is used when deploying or folding a section, such as section 202. Tension gas spring 206 is affixed to section 202 and is configured to present the most tension when tension gas spring 206 is extended, such as in a deployed configuration of a section, such as section 202, and is configured to present the least tension when a section is folded (such as seen in FIG. 1A).

FIG. 2B is a section diagram side view, in accordance with one embodiment. Referring to FIG. 2B, of note, in one embodiment, roller 204 is powered, while roller 218 (hidden behind timing gear 220) is not. Thus, roller 218 is an idler roller, and turns the correct direction based on how power is applied to roller 204 according to a selection associated with direction-controlling switches that may be present on this section or an adjacent section, or a section positioned at one or more ends of conveyor system 100 (FIG. 1). Correspondingly, roller 222 (FIG. 2B) is also powered.

FIG. 2C is a section diagram cutaway view, in accordance with one embodiment.

FIG. 3A is a side view of a partially deployed section, in accordance with one embodiment. Referring to FIG. 3A, in one embodiment, section 308 is a section located either at or near a luggage loading door or an aircraft, or alternatively at a position deepest in the aircraft, and will have a second section (not shown) attached thereto at a connection portion 322. Connection portion 322 includes, in various embodiments such as a straight bar coupling two adjacent sections together, a roller supporting structure securing adjacent rollers of adjacent sections together, or any other means known to those of ordinary skill having the benefit of this disclosure. Thus, roller 319 is a powered roller of an adjacent section. More understanding of the operation and structure of section 308 may be gained with a discussion of FIGS. 5A through 5D.

FIGS. 5A through 5D are snapshots of an animation reflecting the process of deploying the foldable conveyor system, in accordance with one embodiment. Referring to FIGS. 5A through 5D, conveyor system 502 includes a first section 504 including left side 506 and right side 508. First section 504 is shown, in FIG. 5A, in a mostly folded/stored position, for example, at an angle of less than 90 degrees to each other in a side view, and the deployment process for that section has just begun. Note that a second section 510 is coupled to first section 504, and second section 510 is fully deployed. For purposes of this disclosure, fully deployed is considered to be a condition where the half sections, such as left side 506 and right side 508, when viewed on a side form an angle greater than 175 degrees. In configurations where left and right half-sections, such as left side 506 and right side 508, when viewed on a side, have an angle less than a predetermined angle, for example, 175 degrees between them, a limit switch terminates power to any powered rollers within either or both half sections of that section, thus stopping powered movement associated with the respective conveyor belts of those left side and right side half-sections. More particularly, the limit switch operates, in various embodiments, at folding positions where the sections when viewed on a side have an angle less than one or more of 100, 110, 120, 130, 140, 150, 160 and 170 degrees, or any degree measure between 100 and 175 degrees. Handle 519 of section 510 is representative of handles on each section which assist in the folding and deployment processes.

Items 517, 516 and 518 are equivalent to items 340, 322 and 319 (of FIG. 3A) respectively.

Figure 5B:
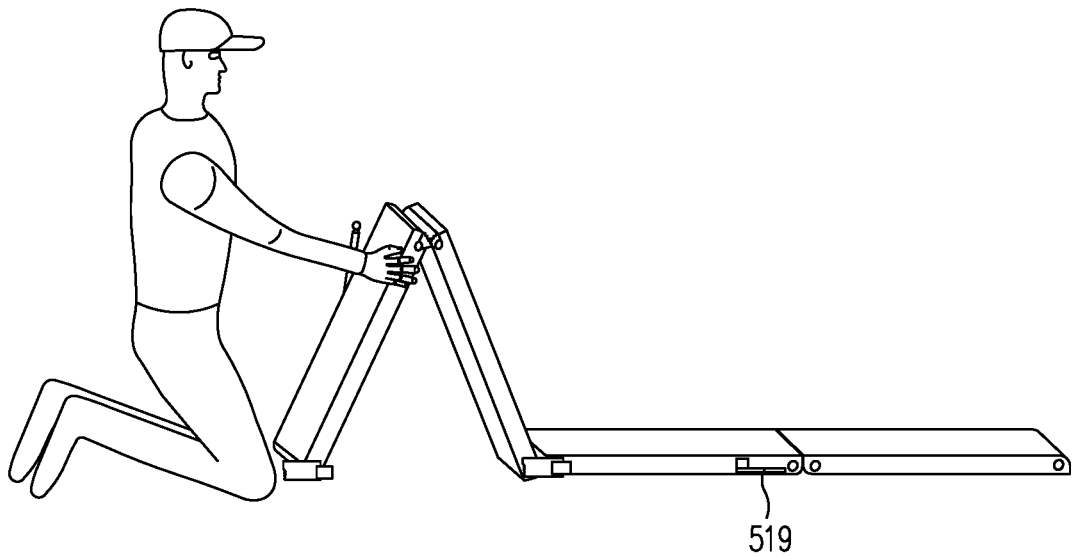
Figure 5C:
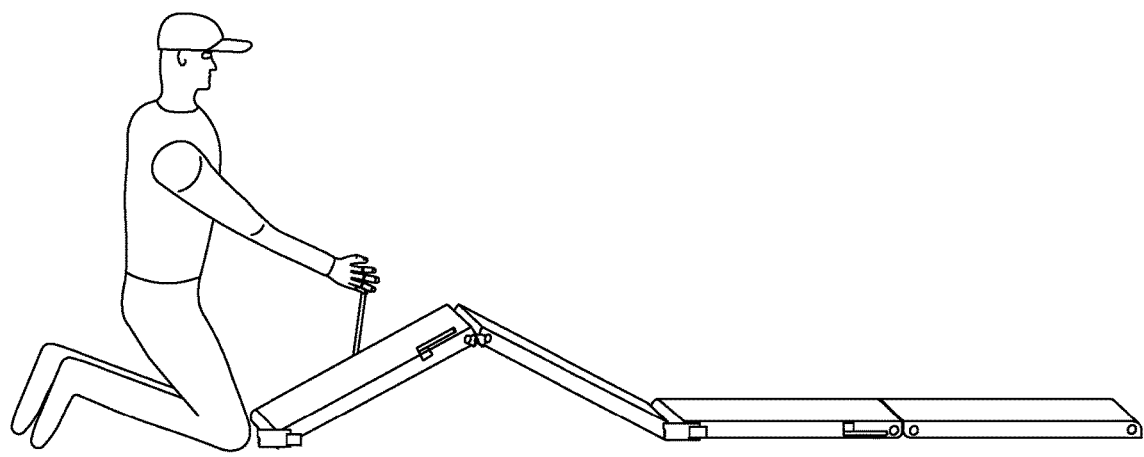
Figure 5D:
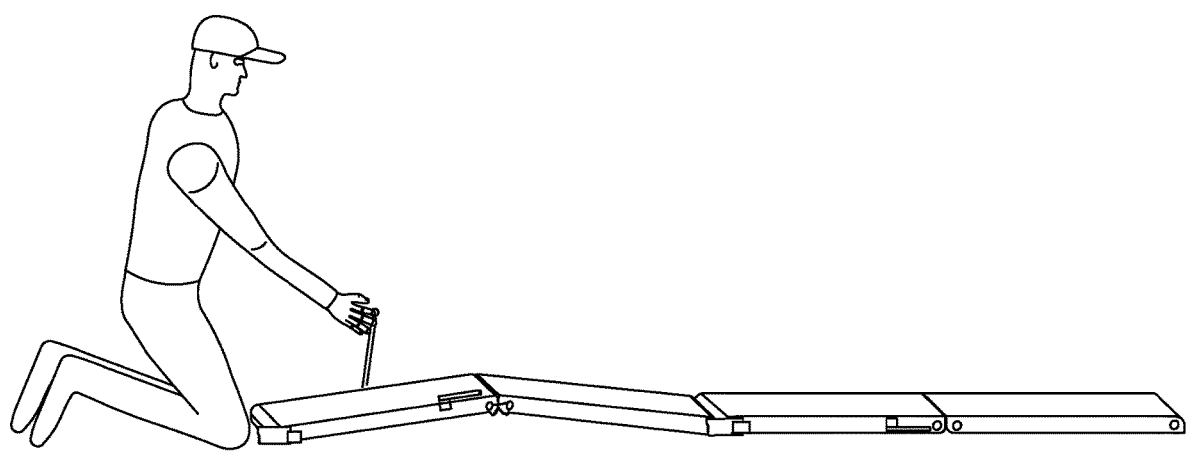

Referring to FIGS. 5B, 5C and 5D, FIG. 5B reflects a slightly more deployed position than FIG. 5A reflects. Correspondingly, FIG. 5C reflects a slightly more deployed position than FIG. 5B reflects, and FIG. 5D reflects a slightly more deployed position than FIG. 5C reflects.

Referring again to FIG. 3A, switch 325 is a main power switch which controls power between a power source, such as a battery, a primary power cord that can be plugged into aircraft, or other power sources, and one or more powered rollers of one or more sections discussed herein. Switch 325 may include wireless controller functionality which switches power to one or more sections on or off depending on the characteristics of data received from a remote controller. Further, switch 325 may be configured to control power to multiple sections. Thus, if a system includes three sections, each section comprising first and second half sections, one power switch is configured to control power to two or more sections.

Handle 308 is coupled through a bar to friction end 335 so that when handle 308 is operated, friction end 335 locks a wheel 340 in place so that the section is drawn upward and the folded/deployed status of adjacent sections are not affected by the folding of the current section. Direction-controlling switch assembly 331 allows an operator to control the direction of rotation of the powered and idler rollers, thus controlling the direction of associated conveyor belts of the various half-sections, such as left side 202 and right side 210 (FIG. 2A) of conveyor system 100 (FIG. 1).

FIG. 3B is a detail view of a portion of FIG. 3A, in accordance with one embodiment. Shown herein is a detail drawing of the timing gear and its operation to ensure that both halves of a given section being folded or deployed share equal halves of the movement. Also shown in FIG. 3B is an approximate location of a limit switch that reduces or eliminates power available to the powered rollers when the section is in a partial or completely folded state.

FIG. 4A is a view of a one half of a partially folded section standing vertically, in accordance with one embodiment.

FIG. 4B is a side cutaway view, in accordance with one embodiment.

FIG. 4C is a detail diagram of a subset of 4B.

Figure 6:
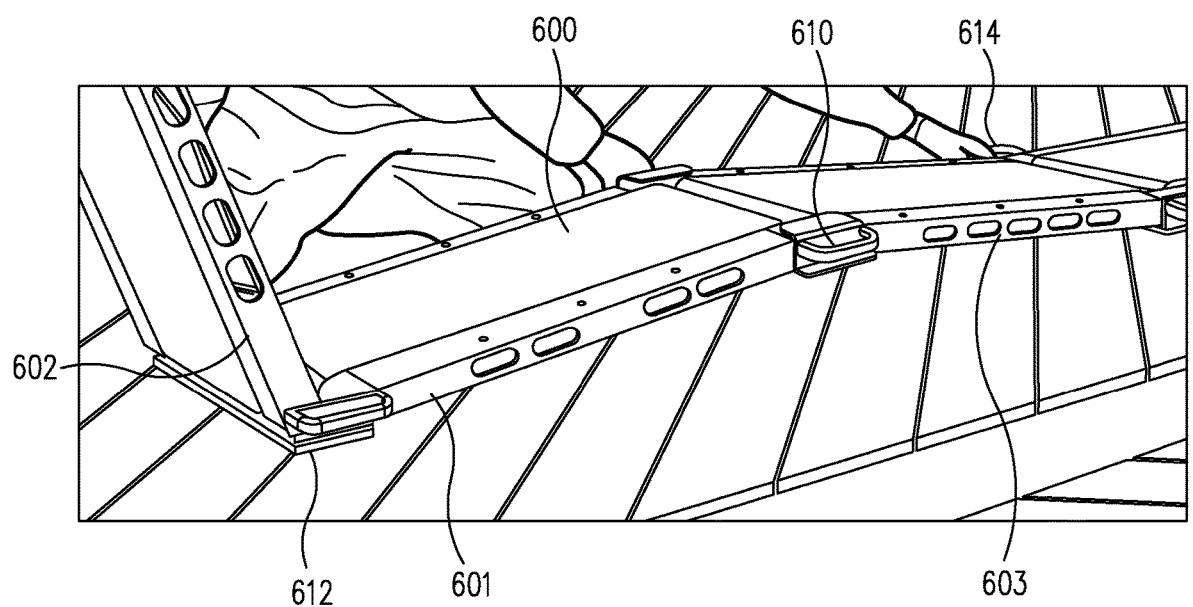
FIG. 6 shows a folded conveyor system in a semi-deployed state, in accordance with one embodiment.

FIG. 6 shows a folded conveyor system in a semi-deployed state, in accordance with one embodiment. As shown in FIG. 6, conveyor system 600 includes half sections 601, 602 and 603, with half sections 601 and 602 being pivotably coupled to a bottom fold handle assembly 612, with half sections 601 and 603 being pivotably coupled to a top fold handle assembly 610, and with half section 603 being pivotably coupled to a bottom fold handle assembly 614. As is also demonstrated in FIG. 6, due to the pivotable coupling of the half sections 601-603 to the top and/or bottom fold handle assemblies 610, 612, 614, adjacent half sections (such as half sections 601 and 602) are foldable together and apart from each other.

As such, a user can move the conveyor system either into a deployed state by moving the top fold handle assembly 610 downward with one hand while moving one of the nearest bottom fold handle assemblies (such as the bottom fold handle assembly 614) away from the top fold handle assembly 610 with the other hand, or into a folded-up state by moving the top fold handle assembly 610 upward with one hand while moving one of the nearest bottom fold handle assemblies toward the top fold handle assembly 610 with the other hand.

FIGS. 7A through 7D are detailed and plan views of the foldable conveyor system, in accordance with one embodiment. In particular, FIG. 7C shows a conveyor system 700 having half sections 701-708 which each include a conveyor belt 709.

FIGS. 8A through 8E are views of a half section 801, in accordance with one embodiment, which could correspond for example to any of half sections 701-708 shown in FIG. 7C. As shown in FIG. 8B, the half section 801 includes a powered roller 811 at a powered roller end 813 of the half section 801, and a non-powered roller 815 at a non-powered roller end 817 of the half section 801. As shown in FIGS. 8C and 8E, a conveyor belt 809 is frictionally coupled to the powered roller 811 and the non-powered roller 815.

Referring again to FIG. 7C, the conveyor system 700 includes top fold handle assemblies 710 and bottom fold handle assemblies 712. Further, FIG. 7A shows a detail view of the region A depicted in FIG. 7C, and FIG. 7B shows a detail view of the region B depicted in FIG. 7C. As shown in FIG. 7A, the half sections 705 and 706 each include a non-powered roller 715 at a respective non-powered roller end 717 of the half sections 705 and 706, and as shown in FIG. 7B, the half sections 706 and 707 each include a powered roller 711 at a respective powered roller end 713 of the half sections 706 and 707.

As shown in FIG. 7A, the top fold handle assembly 710 is arranged between the non-powered roller ends 717 of the half sections 705 and 706, and as shown in FIG. 7B, the bottom fold handle assembly 712 is arranged between the powered roller ends 713 of the half sections 706 and 707. Further, the non-powered roller ends 717 of the half sections 705 and 706 are pivotably coupled to the top fold handle assembly 710 such that the half sections 705 and 706 are foldable together and apart from each other, and the powered roller ends 713 of the half sections 706 and 707 are pivotably coupled to the bottom fold handle assembly 712 such that the half sections 706 and 707 are foldable together and apart from each other.

In one embodiment, the non-powered roller ends 717 of the half sections 705 and 706 are pivotably coupled to the top fold handle assembly 710 for example by the top fold handle assembly 710 having bolts which are screwed into ends of the non-powered rollers 715. In another embodiment, the powered roller ends 713 of the half sections 706 and 707 are pivotably coupled to the bottom fold handle assembly 712 for example by bolts connected to pivot points on the bottom fold handle assembly 712.

Figure 7E:
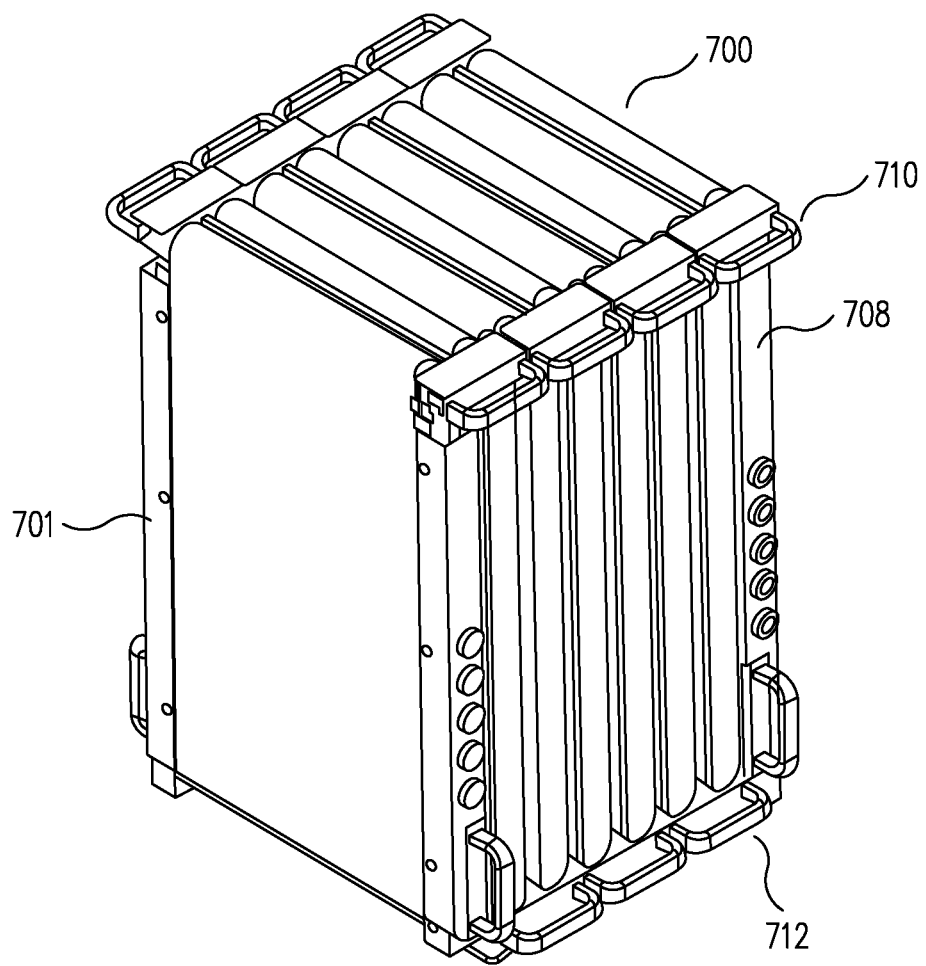
FIG. 7E is a perspective view of the conveyor system in a folded-up state, in accordance with one embodiment.
Figure 9D:
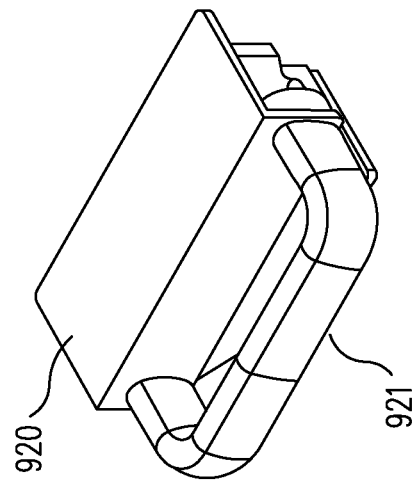
FIG. 9D is a perspective view of the top fold handle assembly shown in FIGS. 9A-9C.
Figure 9C:
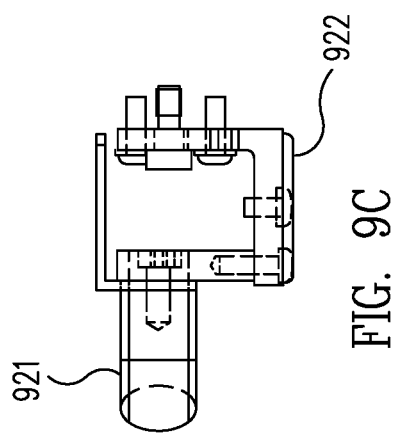
FIG. 9C is an end view of the top fold handle assembly shown in FIG. 9A.
Figure 9A:
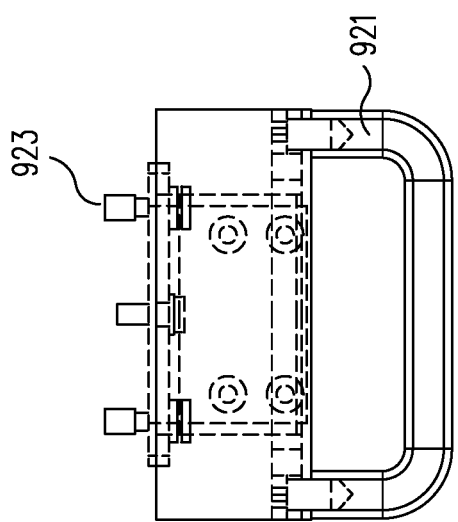
FIG. 9A is a top view of a top fold handle assembly, in accordance with one embodiment.
Figure 9B:
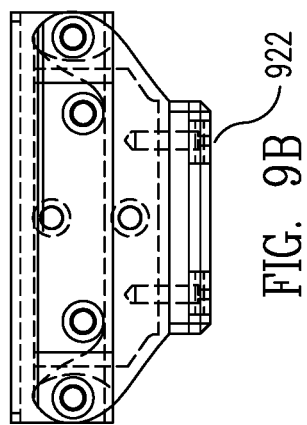
FIG. 9B is a side view of the top fold handle assembly shown in FIG. 9A.

Due to the pivotable coupling of the top fold handle assemblies 710 to adjacent pairs of non-powered roller ends 717 of the half sections 701-708, and the pivotable coupling of the bottom fold handle assemblies 712 to adjacent pairs of powered roller ends 713 of the half sections 702-707, the conveyor system 700 can be changed from the deployed state shown in FIGS. 7C and 7D to the folded-up state shown in FIG. 7E by sequentially moving the top fold handle assemblies 710 upward with one hand while moving one of the nearest bottom fold handle assemblies inward with the other hand. Similarly, the conveyor system 700 can be changed from the folded-up state shown in FIG. 7E to the deployed state shown in FIGS. 7C and 7D by sequentially moving the top fold handle assemblies 710 downward with one hand while moving one of the nearest bottom fold handle assemblies outward with the other hand.

In one embodiment, a top fold handle assembly (such as, for example, the top fold handle assembly 710 shown in FIG. 7C) comprises two handle units 920, as shown in FIGS. 9A-9D. Each handle unit 920 includes a handle 921 designed for a gloved hand to have easy access. Further, each handle unit 920 has a contact portion 922 which contacts a ground surface when the conveyor system is in a fully-deployed state. Each handle unit 920 can also include, according to one embodiment, bolts 923 which are to be screwed into ends of adjacent non-powered rollers to form the pivotable coupling between the top fold handle assembly and the adjacent half sections.

By arranging two of the individual handle units 920 on opposite sides of the conveyor belt in a width direction of the conveyor belt (such as, for example, according to the configuration of the top fold handle assembly 710 shown in FIG. 7C), the contact portions 922 of the two handle units 920 are spaced apart from each other in the width direction of the conveyor belt. Such an arrangement allows for the contact portions 922 of the top fold handle assembly to distribute the weight of the conveyor system while also allowing the adjacent half sections to fold together at the top fold handle assembly.

Figure 10D:
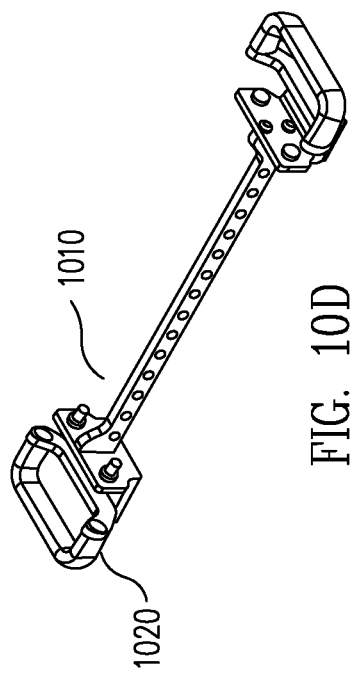
FIG. 10D is a perspective view of the top fold handle assembly shown in FIGS. 10A-10C.
Figure 10C:
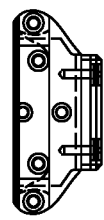
FIG. 10C is an end view of the top fold handle assembly shown in FIG. 10A.
Figure 10A:
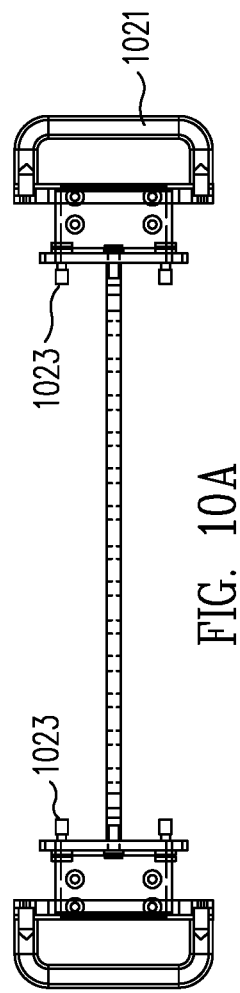
FIG. 10A is a top view of a top fold handle assembly, in accordance with one embodiment.
Figure 10B:
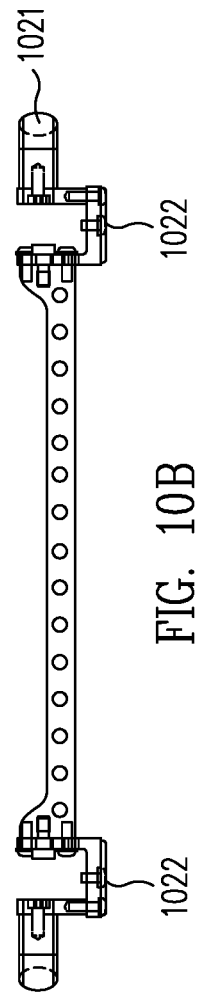
FIG. 10B is a side view of the top fold handle assembly shown in FIG. 10A.

In another embodiment, a top fold handle assembly 1010 comprises two handle units 1020, as shown in FIGS. 10A-10D. Each handle unit 1020 is similar to the handle unit 920 shown in FIGS. 9A-9D, and includes a handle 1021, a contact portion 1022 which contacts a ground surface when the conveyor system is in a fully-deployed state, and bolts 1023 which are to be screwed into ends of adjacent non-powered rollers to form the pivotable coupling between the top fold handle assembly and the adjacent half sections. As shown in FIG. 10B, the handle units 1020 are connected by a pivot plate stiffener 1024, with the contact portions 1022 of the two handle units 1020 still being spaced apart from each other in the width direction of the conveyor belt so as to allow for the contact portions 1022 of the top fold handle assembly to distribute the weight of the conveyor system while also allowing the adjacent half sections to fold together at the top fold handle assembly.

FIGS. 11A-11D show a bottom fold handle assembly 1112, in accordance with one embodiment. The bottom fold handle assembly 1112 includes two handles 1121 connected to opposite ends of a support plate 1122, with each handle 1121 being designed for a gloved hand to have easy access. The bottom fold handle assembly 1112 can also include, according to one embodiment, bolts 1123 at four pivot points which are to be connected to the powered roller ends of two adjacent half sections to form the pivotable coupling between the bottom fold handle assembly and the adjacent half sections.

Figure 11D:
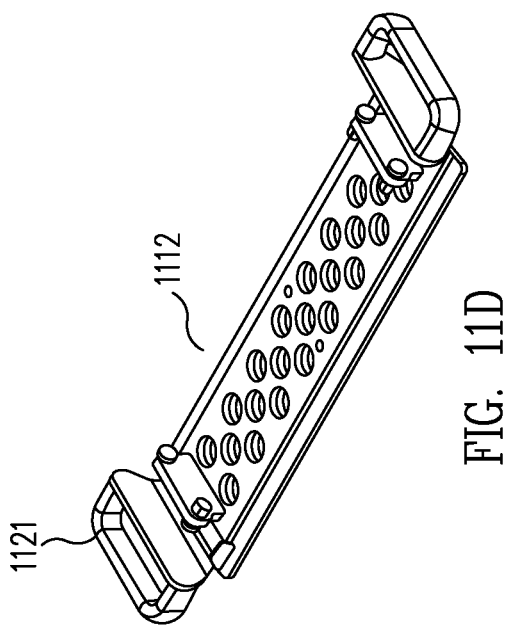
FIG. 11D is a perspective view of the bottom fold handle assembly shown in FIGS. 11A-11C.
Figure 11C:
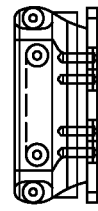
FIG. 11C is an end view of the bottom fold handle assembly shown in FIG. 11A.
Figure 11A:
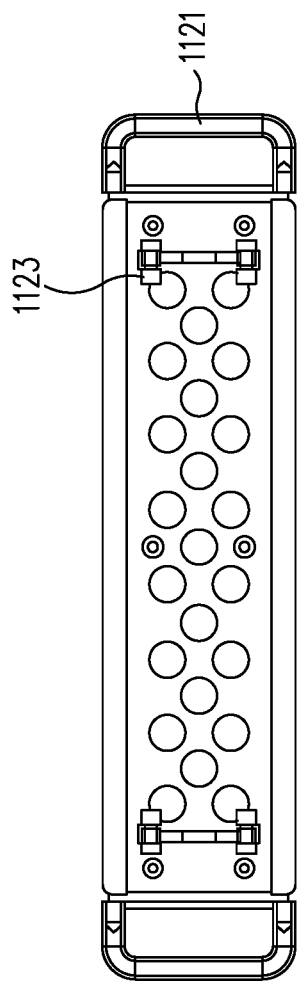
FIG. 11A is a top view of a bottom fold handle assembly, in accordance with one embodiment.
Figure 11B:
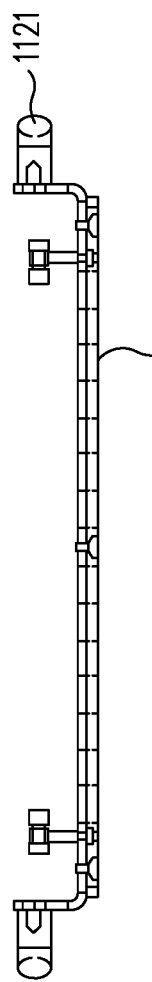
FIG. 11B is a side view of the bottom fold handle assembly shown in FIG. 11A.

The two handles 1121 are arranged on opposite sides of the support plate 1122 such that the handles 1121 are also on opposite sides of the conveyor belt in a width direction of the conveyor belt (such as, for example, according to the configuration of the bottom fold handle assembly 712 shown in FIG. 7C). Further, as shown in FIG. 11B, the support plate 1122 extends continuously in the width direction of the conveyor belt from the one handle 1121 to the other. Such an arrangement allows for the support plate 1122 of the bottom fold handle assembly to distribute the weight of the conveyor system across its entire width, while also allowing the support plate 1122 to remain in contact with a ground surface during folding and un-folding of the conveyor system.

Figure 12E:
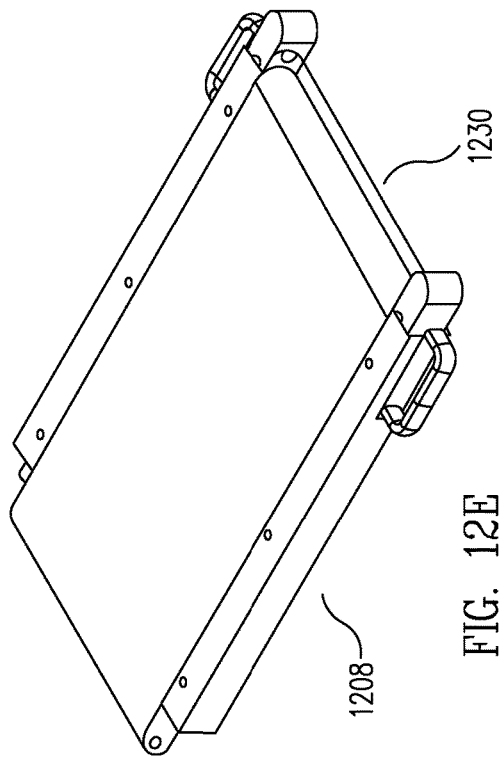
FIG. 12E is a perspective view of the half section shown in FIGS. 12A-12D.
Figure 12D:
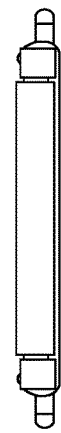
FIG. 12D is an end view of the half section shown in FIG. 12C.
Figure 12A:
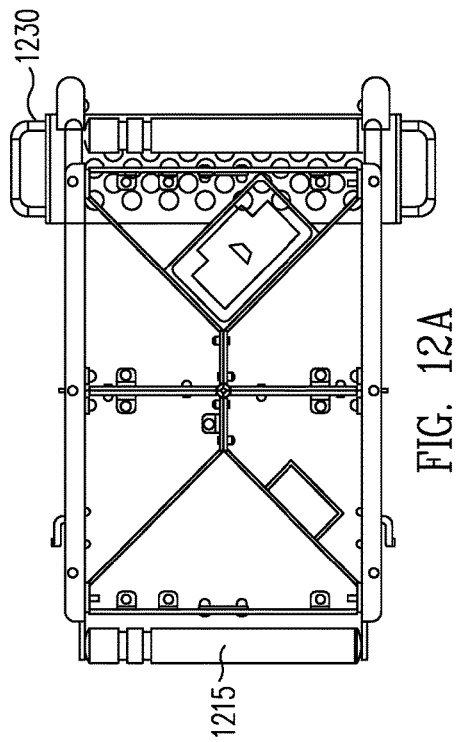
FIG. 12A is a top sectional view of a half section of a conveyor system, in accordance with one embodiment.
Figure 12B:
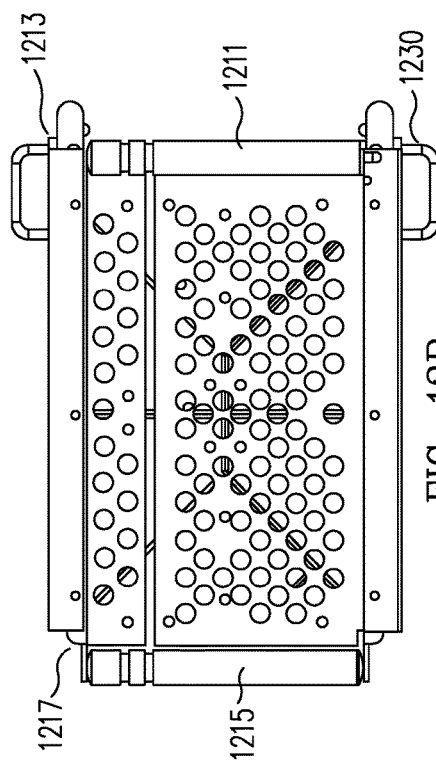
FIG. 12B is a top view of the half section shown in FIG. 12E, with the conveyor belt removed.
Figure 12C:
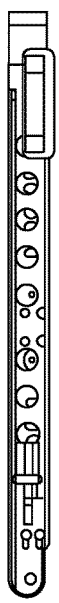
FIG. 12C is a side view of the half section shown in FIG. 12E.

FIGS. 12A through 12E are views of a half section 1208, in accordance with one embodiment, which could correspond for example to any of half sections 701 and 708 shown in FIG. 7C. As shown in FIG. 12B, the half section 1208 includes a powered roller 1211 at a powered roller end 1213 of the half section 1208, and a non-powered roller 1215 at a non-powered roller end 1217 of the half section 1208. As shown in FIGS. 12A, B and E, the half section 1208 also includes an end handle assembly 1230 fixed to the powered roller end 1213 of the half section 1208.

Figure 13D:
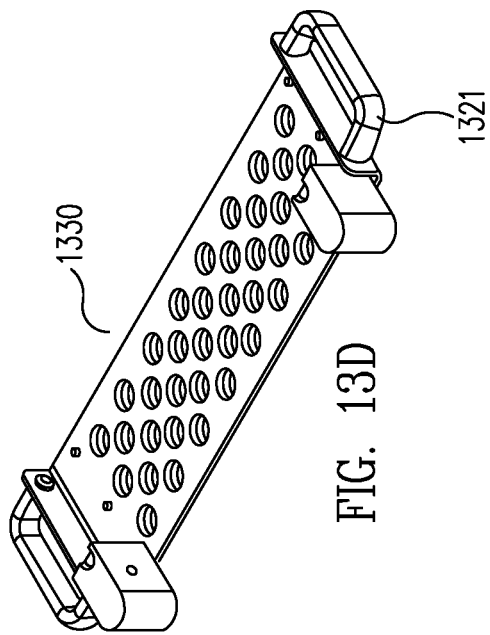
FIG. 13D is a perspective view of the end handle assembly shown in FIGS. 13A-13C.
Figure 13C:
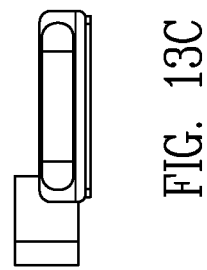
FIG. 13C is an end view of the end handle assembly shown in FIG. 13A.
Figure 13A:
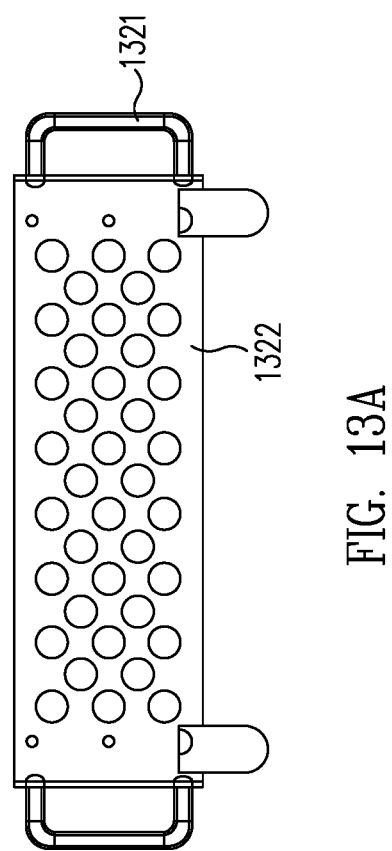
FIG. 13A is a top view of an end handle assembly, in accordance with one embodiment.
Figure 13B:
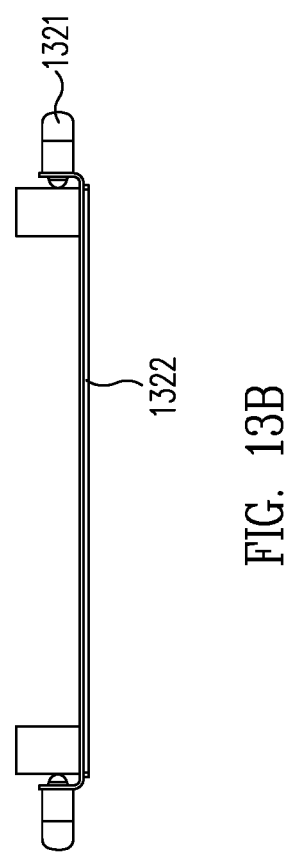
FIG. 13B is a side view of the end handle assembly shown in FIG. 13A.

FIGS. 13A-13D are views of an end handle assembly 1330, in accordance with one embodiment. As shown in FIGS. 13A and D, the end handle assembly 1330 includes a plate 1322 and two handles 1321, with each handle 1321 being designed for a gloved hand to have easy access. The handles 1321 are arranged at opposite ends of the plate 1322, with the plate 1322 extending continuously from one handle 1321 to the other handle. Such an arrangement allows for the plate 1322 of the end handle assembly to distribute the weight of the conveyor system across its entire width, while also allowing the plate 1322 to remain in contact with a ground surface when the conveyor system is in a semi-deployed or fully deployed state.

In various embodiments, the contact portions of the top fold handle assembly, the support plate of the bottom fold handle assembly and the plate of the end handle assembly are designed to distribute the weight of the conveyor system to meet desired weight restrictions. In one embodiment, for example, the desired weight restriction could be a floor bearing weight restriction for the floor of an aircraft, such as a weight restriction of 150 pounds per square foot.

In various embodiments, the contact portions of the top fold handle assembly, the support plate of the bottom fold handle assembly and the plate of the end handle assembly are made of a material that aids in weight distribution and that allows for easy sliding of the conveyor system without damaging any surface, such as for example ultra-high-molecular-weight polyethylene (UHMW).

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A foldable conveyor system comprising:
a moving component formed of a first half section, a second half section and a third half section, the first, second and third half sections each being rectangularly formed, at least the first half section having a conveyor belt that runs along a long side of a rectangle associated with its rectangular formation and that has a width extending along a short side of the rectangle associated with its rectangular formation,
the first half section having a powered roller at a powered roller end of the first half section and a non-powered roller at a non-powered roller end of the first half section, the conveyor belt being frictionally coupled to the powered roller and the non-powered roller of the first half section, the powered roller being a roller having electrical power supplied thereto and powering movement of the conveyor belt according to a setting of a direction-controlling switch,
the second half section having a powered roller at a powered roller end of the second half section,
the third half section having a non-powered roller at a non-powered roller end of the third half section;
a top fold handle assembly arranged between the non-powered roller end of the first half section and the non-powered roller end of the third half section, the non-powered roller end of the first half section and the non-powered roller end of the third half section each being pivotably coupled to the top fold handle assembly such that the first and third half sections are foldable together and apart from each other; and
a bottom fold handle assembly arranged between the powered roller end of the first half section and the powered roller end of the second half section, the powered roller end of the first half section and the powered roller end of the second half section each being pivotably coupled to the bottom fold handle assembly such that the first and second half sections are foldable together and apart from each other.

2. The foldable conveyor system of claim 1, wherein the top fold handle assembly comprises first and second handle units, the first and second handle units each having a handle, the first and second handle units each having a contact portion which contacts a ground surface when the conveyor system is in a fully-deployed state,
   wherein the first handle unit is arranged on one side of the moving component in a width direction of the conveyor belt and the second handle unit is arranged on an opposite side of the moving component in the width direction of the conveyor belt such that the contact portions of the first and second handle units are spaced apart from each other in the width direction of the conveyor belt.

3. The foldable conveyor system of claim 1, wherein the bottom fold handle assembly comprises a plate and first and second handles arranged at opposite ends of the plate, the bottom fold handle assembly being arranged such that the first and second handles are positioned on respective opposite sides of the moving component in a width direction of the conveyor belt,
   and wherein the plate extends continuously in the width direction of the conveyor belt from the first handle to the second handle so as to remain in contact with a ground surface during folding and un-folding of the conveyor system.

4. The foldable conveyor system of claim 1, further comprising:
   an end handle assembly having a plate and first and second handles arranged at opposite ends of the plate,
   wherein the third half section has a powered roller at a powered roller end of the third half section, the end handle assembly being fixed to the third half section at the powered roller end of the third half section such that the first and second handles are positioned on respective opposite sides of the moving component in a width direction of the conveyor belt,
   wherein the plate extends continuously in the width direction of the conveyor belt from the first handle to the second handle.

5. A foldable conveyor system comprising:
   a luggage moving component formed of a first half section, a second half section and a third half section, the first, second and third half sections each being rectangularly formed, at least the first half section having a conveyor belt that runs along a long side of a rectangle associated with its rectangular formation and that has a width extending along a short side of the rectangle associated with its rectangular formation,
   the first half section having a powered roller at a powered roller end of the first half section and a non-powered roller at a non-powered roller end of the first half section, the conveyor belt being frictionally coupled to the powered roller and the non-powered roller of the first half section, the powered roller being a roller having electrical power supplied thereto and powering movement of the conveyor belt according to a setting of a direction-controlling switch,
   the second half section having a powered roller at a powered roller end of the second half section,
   the third half section having a non-powered roller at a non-powered roller end of the third half section;
   a top fold handle assembly arranged between the non-powered roller end of the first half section and the non-powered roller end of the third half section, the non-powered roller end of the first half section and the non-powered roller end of the third half section each being pivotably coupled to the top fold handle assembly such that the first and third half sections are foldable together and apart from each other; and
   a bottom fold handle assembly arranged between the powered roller end of the first half section and the powered roller end of the second half section, the powered roller end of the first half section and the powered roller end of the second half section each being pivotably coupled to the bottom fold handle assembly such that the first and second half sections are foldable together and apart from each other.

6. The foldable conveyor system of claim 5, wherein the top fold handle assembly comprises first and second handle units, the first and second handle units each having a handle, the first and second handle units each having a contact portion which contacts a ground surface when the conveyor system is in a fully-deployed state,
   wherein the first handle unit is arranged on one side of the luggage moving component in a width direction of the conveyor belt and the second handle unit is arranged on an opposite side of the luggage moving component in the width direction of the conveyor belt such that the contact portions of the first and second handle units are spaced apart from each other in the width direction of the conveyor belt.

7. The foldable conveyor system of claim 5, wherein the bottom fold handle assembly comprises a plate and first and second handles arranged at opposite ends of the plate, the bottom fold handle assembly being arranged such that the first and second handles are positioned on respective opposite sides of the luggage moving component in a width direction of the conveyor belt,
   and wherein the plate extends continuously in the width direction of the conveyor belt from the first handle to the second handle so as to remain in contact with a ground surface during folding and un-folding of the conveyor system.

8. The foldable conveyor system of claim 5, further comprising:
   an end handle assembly having a plate and first and second handles arranged at opposite ends of the plate,
   wherein the third half section has a powered roller at a powered roller end of the third half section, the end handle assembly being fixed to the third half section at the powered roller end of the third half section such that the first and second handles are positioned on respective opposite sides of the luggage moving component in a width direction of the conveyor belt,
   wherein the plate extends continuously in the width direction of the conveyor belt from the first handle to the second handle.

\* \* \* \* \*